United States Patent
Schumann

(10) Patent No.: US 6,305,508 B1
(45) Date of Patent: Oct. 23, 2001

(54) ELECTROMECHANICAL WHEEL BRAKE DEVICE

(75) Inventor: Frank Schumann, Boennigheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/296,495

(22) Filed: Apr. 22, 1999

(30) Foreign Application Priority Data

Apr. 23, 1998 (DE) .............................................. 198 18 157

(51) Int. Cl.[7] .................................................... F16D 55/08
(52) U.S. Cl. ............................................................ 188/72.8
(58) Field of Search ................................. 188/72.1, 72.8, 188/156, 157, 162, 196, 196 V

(56) References Cited

U.S. PATENT DOCUMENTS

| | | | | |
|---|---|---|---|---|
| 3,976,168 | * | 8/1976 | Yamamoto | 188/71.9 |
| 3,994,098 | * | 11/1976 | Konersmann et al. | 51/26 |
| 4,011,776 | * | 3/1977 | Kodama et al. | 74/789 |
| 4,289,970 | * | 9/1981 | Deibert | 290/44 |
| 4,400,998 | * | 8/1983 | Bookout et al. | 74/740 |
| 4,804,073 | * | 2/1989 | Taig et al. | 188/72.1 |
| 5,123,505 | * | 6/1992 | Antony | 188/71.9 |
| 5,127,887 | * | 7/1992 | Nuttall | 475/2 |
| 5,680,912 | * | 10/1997 | Herbert et al. | 188/72.9 |
| 5,769,189 | * | 6/1998 | Heibel et al. | 188/156 |
| 5,829,557 | * | 11/1998 | Halasy-Wimmer et al. | 188/162 |
| 6,039,158 | * | 3/2000 | Fox et al. | 188/162 |

FOREIGN PATENT DOCUMENTS

WO 97/11287 * 3/1997 (GB) .................................. 188/72.1

OTHER PUBLICATIONS

Hypoid gear set combines high reduction and compactness by Charles J. Murray.*
Hypoid gear definition.*

* cited by examiner

Primary Examiner—Christopher P. Schwartz
Assistant Examiner—Xuan Lan Nguyen
(74) Attorney, Agent, or Firm—Ronald E. Greigg; Edwin E. Greigg

(57) ABSTRACT

The invention relates to an electromechanical wheel brake device with a brake caliper that is embodied of one piece with a gear housing in which a planetary roller screw drive for pressing frictional brake linings against a brake disk and a bevel gear pair for driving the planetary roller screw drive to rotate are accommodated. In order to keep a ring gear free of a force that acts axially on a nut of the planetary roller screw drive when the frictional brake linings are pressed against the brake disk, the device affixes a ring gear of the bevel gear pair in a rotationally fixed and axially mobile manner to the nut, for example by means of a multi-groove profile, and supporting the bevel gear with a separate axial bearing in the rigidly embodied gear housing.

23 Claims, 1 Drawing Sheet

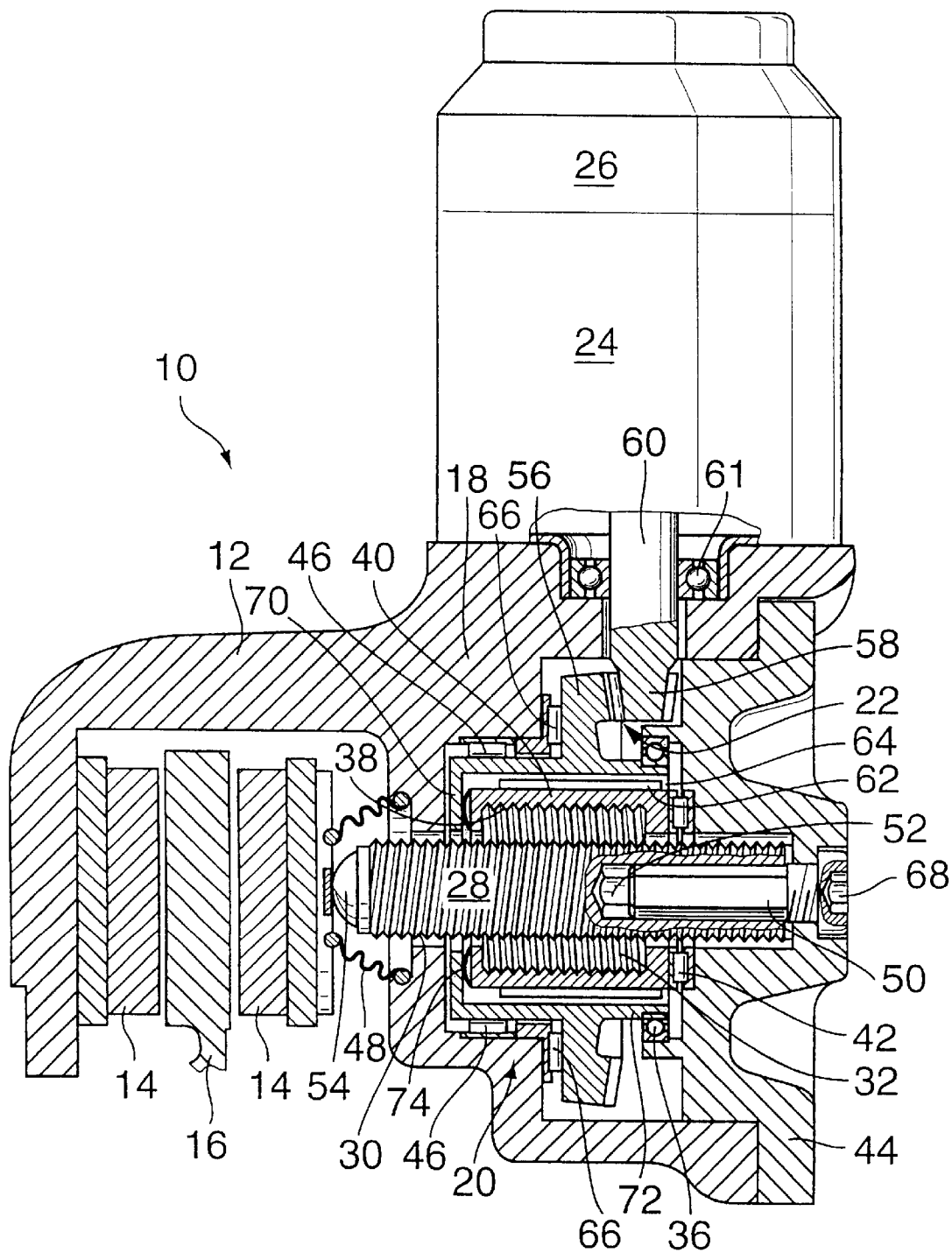

ELECTROMECHANICAL WHEEL BRAKE DEVICE

BACKGROUND OF THE INVENTION

The invention relates to an electromechanical wheel brake device set forth hereinafter.

A wheel brake device of this kind has been disclosed by DE 196 31 592 A1. The known wheel brake device has an electric motor which, in order to actuate the wheel brake device by way of a worm gear, i.e. an angular gear, drives a nut of a screw link actuator to rotate. A spindle of the screw link actuator presses a frictional brake lining against a brake body and thus produces a brake force or a brake moment. The known wheel brake device is embodied as a disk brake with a floating caliper; the electric motor, the worm gear, and the screw link actuator are accommodated in the floating caliper. The brake body is a brake disk that is connected in a rotationally fixed manner to a vehicle wheel. The screw link actuator is a rotation/translation conversion gear that converts a rotating drive motion of the angular gear into a translational motion for pressing the frictional brake lining against the brake body or releasing the brake lining from the brake body. In lieu of the nut, the spindle can be driven in a rotary fashion and the displacement motion of the nut thus produced can be used for the pressure application of the frictional brake lining.

The known wheel brake device with the worm gear has the disadvantage that depending on its type, the worm drive has a high proportion of sliding friction and as a result, has a poor efficiency and a high degree of wear. The wear reduces the efficiency over the service life. Moreover, there is a poor starting behavior as a result of the high degree of sliding friction, which impairs the ability of the wheel brake device to be metered. Due to the high proportion of sliding friction, which is required in principle, a large part of the energy is lost, primarily in reverse operation as an adjusting or -positioning gear. This results in a high degree of stress on the electric motor and its power supply.

OBJECT AND SUMMARY OF THE INVENTION

The wheel brake device according to the invention has the advantage over the prior art that the wheel brake device has a bevel gear pair as an angular gear. Due to a mutual rotating motion of the reciprocally meshing gear teeth of a bevel gear and a ring gear, the bevel gear pair has a low proportion of sliding friction and consequently has an improved efficiency and a low degree of wear. At a given capacity, the bevel gear pair can be accommodated in a smaller space and has a lower mass than a worm gear. A uniform transmission of force and moment is assured by means of a high contact ratio of the gear teeth of the pinion and the ring gear. The bevel gear pair has a good startup behavior, by means of which the brake force of the wheel brake device according to the invention can be finely metered.

The bevel gear pair, however, is susceptible to an axial displacement of the ring gear in relation to the bevel gear that meshes with the ring gear. The tooth flank play decreases or increases as a result of an axial displacement of the ring gear so that the gear teeth of the bevel gear and the ring gear do not mesh with each other and mutually rotate in the structurally provided manner so that even a slight axial displacement of the ring gear leads to a pronounced worsening of the efficiency of the bevel gear pair. The wear also increases. In order to prevent an axial displacement of the ring gear, in the wheel brake device according to the invention, the ring gear that drives the rotation/translation conversion gear to rotate is de-coupled from a reaction force, which results from a pressing force with which the rotation/translation conversion gear presses the frictional brake lining against the brake body. For the force de-coupling, the ring gear is connected in a rotationally fixed, axially mobile manner with the drive element of the rotation/translation conversion gear, i.e. for example to the nut or spindle of a screw link actuator. The rotationally fixed and axially mobile connection can be produced, for example, by means of a polygon profile, a multi-groove profile, or a serrated profile. The ring gear has a separate axial position that is independent of an axial position of the rotation/translation conversion gear. The axial position of the rotation/translation conversion gear axially supports this gear when the frictional brake lining is pressed against the brake body. The ring gear is free of the pressing force of the frictional brake lining against the brake body and from the resultant reaction force.

In order to maintain as exactly as possible the position of the ring gear in relation to the bevel gear that belongs to the bevel gear pair that meshes with it, the position of the ring gear is rigidly connected to a pivot bearing of the bevel gear, for example by way of a gear housing. The bevel gear can be attached to a motor shaft of the electric motor so that the motor shaft bearing is at the same time the pivot bearing of the bevel gear. Through the rigid connection of the pivot bearing of the bevel gear with the bearing of the ring gear, a structurally provided tooth flank play can be maintained in an almost constant manner even under stress and as a result, a favorable efficiency and low wear are achieved, even under stress.

Advantageous improvements and updates of the invention disclosed are possible by means of the measures set forth hereinafter.

The invention will be better understood and further objects and advantages thereof will become more apparent from the ensuing detailed description of preferred embodiments taken in conjunction with the drawing.

BRIEF DESCRIPTION OF THE DRAWING

The sole FIGURE shows an axial section through a wheel brake device according to the invention, in a partially schematic, simplified depiction.

DESCRIPTION OF THE PREFERRED EMBODIMENTS

The electromechanical wheel brake device 10 according to the invention, which is shown in the sole FIGURE, is embodied as a disk brake. Its brake caliper 12 is embodied as a so-called floating caliper in which two frictional brake linings 14 are contained, between which a rotatable brake disk 16 is disposed. The brake caliper 12 is embodied of one piece with a gear housing 18 in which a rotation/translation conversion gear 20 and an angular gear 22 are accommodated. In order to actuate the wheel brake device 10, an electric motor 24 is flanged-mounted to the gear housing 18. The electric motor 24 is disposed with its imaginary axis parallel to the brake disk 16 and spaced laterally apart from it. The electric motor 24 has a motor brake 26 that is closed when without current and can be released electromagnetically, which is flange-mounted to the electric motor 24. Electromagnetic motor brakes 26 of this kind are intrinsically known to one skilled in the art.

The rotation/translation conversion gear 20 is provided for pressing the frictional brake linings 14 against the brake disk 16. This gear is embodied as a helical gear. In the exemplary embodiment shown, a planetary roller screw drive 20 is chosen as the rotation/translation conversion gear. The planetary roller screw drive 20 has a spindle 28 that is disposed at right angles to the brake disk 16 and to the frictional brake linings 14 and the spindle threads 30 of this spindle engage with a number of, for example eight, threaded rollers 32. The threaded rollers 32 are disposed distributed equidistantly around the spindle 28.

In addition to engaging with the spindle 28, the threaded rollers 32 engage with a nut groove 38 of a nut 40, which is disposed in the gear housing 18, coaxial to and encompassing the spindle 28. In the same manner as the threaded rollers 32 and the spindle 28, the nut 40 is a component of the planetary roller screw drive 20, which constitutes the rotation/translation conversion gear of the wheel brake device 10 according to the invention.

By way of an axial bearing 42 that is embodied as a roller bearing, the nut 40 is axially supported against a housing cover 44, which, on an end remote from the brake disk 16, is secured to the gear housing 18 with screws that are not shown. Radially, the nut 40 is supported so that it can rotate in the gear housing 18, with a radial bearing 46 that is likewise embodied as a roller bearing 46.

In order to prevent dirt from penetrating into the gear housing 18, a bellows sealing collar 48 is attached to the brake caliper 12, and this bellows sealing collar encompasses an end of the spindle 28 that protrudes from the gear housing 18 on the side of the brake disk 16 and encloses an intermediary space between the gear housing 18 and the frictional brake lining 14 that is depicted on the right in the drawing.

The spindle 28 of the planetary roller screw drive 20 is mounted in an axially mobile and rotationally fixed manner on a rotation prevention bolt 50, which is screwed into the housing cover 44 of the gear housing 18 coaxial to the spindle 28. The rotation prevention bolt 50 is embodied as a hexagon that engages in a complementary internal hexagon 52 of the spindle 28.

The rotation/translation conversion gear 20 functions as follows: Through the rotating drive of the nut 40, the threaded rollers 32 engaging with the nut grooves 38 are driven into a revolving motion around the spindle 28. At the same time, the threaded rollers 32 rotate around their own axes. The threaded rollers 32 thus move around the spindle 28 after the fashion of planetary gears of a planetary roller screw drive. Since the threaded rollers 32 also engage with the spindle threads 30, the rotating motion of the threaded rollers 32 around the spindle 28 and the rotation of the threaded rollers 32 around their own axes produce an axial displacement of the spindle 28 in relation to the nut 40 and in relation to the brake caliper 12, since by way of the axial bearing 42, the nut 40 is immobile in the gear housing 18 and in the brake caliper 12.

A ball 54 is inserted into the end of the spindle 28 oriented toward the brake disk 16 and is rotatably held in the spindle 28 by means of caulking the spindle 28. The spindle 28 presses with the ball 54 against the frictional brake lining 14 shown on the right in the drawing on the side of the brake disk 16 oriented toward the spindle 28. If the nut 40 is driven to rotate in an advancing rotation direction, the spindle 28 moves in the direction of the brake disk 16 and presses the one frictional brake lining 14 against the one side of the brake disk 16. The application force of the one frictional brake lining 14 against the one side of the brake disk 16 produces a reaction force that presses the other frictional brake lining 14 against the other side of the brake disk 16 by way of the brake caliper 12 that is embodied as a floating caliper. Driving the nut 40 to rotate in the advancing rotation direction consequently exerts a brake force or a brake moment on the brake disk 16. By driving the nut 40 in the opposite rotation direction, i.e. in the resetting rotation direction, the brake force or the brake moment is reduced or the frictional brake linings 14 are entirely lifted from the brake disk 16.

When resetting, the sealing collar 48, due to its elasticity, holds the one frictional brake lining 14 in contact with the ball 54 of the spindle 28.

The angular gear 22 is provided for rotationally driving the nut 40 of the screw link actuator 20. The angular gear 22 is embodied as a hypoid-geared bevel gear pair 22. It has a ring gear 56 attached to the nut 40 in a rotationally fixed manner, which meshes with a bevel gear 58 that is of one piece with a motor shaft 60 of the electric motor 24. The gear teeth of the ring gear 56 and the bevel gear 58 are provided with an anti-slip and anti-wear layer of an intrinsically known type.

An angular gear 22 first of all has the advantage that the electric motor 24 of the wheel brake device 10 can be adapted to the space available in a vehicle wheel, laterally next to the brake disk 16 and therefore laterally next to a vehicle wheel, not shown, without the electric motor 24 protruding a great deal laterally from the vehicle wheel and thus being intrusively in the way. In the disposition of the electric motor 24, it must be noted that the vehicle wheel to be braked can be a steered wheel, wherein the electric motor 24 follows along with the pivoting movements of the vehicle wheel when turning so that a laterally protruding electric motor would be intrusively in the way of a vehicle wheel suspension and a steering rod linkage. The brake caliper 12 that is disposed at right angles to the electric motor 24 protrudes into an inner space of a rim of the vehicle wheel in which the brake disk 16 is disposed. The electric motor 24 does not have to protrude upward from the brake caliper 12 as shown in the drawing; it can be disposed in an arbitrary direction radial to the screw link actuator 20.

The advantages of using a bevel gear pair 22 as an angular gear are its uniform running, high efficiency, low wear, and its good startup behavior, particularly under load.

The ring gear 56 of the bevel gear pair 22 is disposed in an axially mobile, rotationally fixed manner on the nut 40 of the planetary roller screw drive 20. The ring gear 56 has a bushing 72 that is of one piece with it and is slightly longer than the nut 40. With its bushing 72, the ring gear 56 is slid onto the nut 40 and can thus be moved axially in relation to the nut 40. A multi-grooved profile 62, 64 is provided for the rotationally fixed connection of the ring gear 56 to the nut 40: the nut 40 has sliding keys 62 that are of one piece with it, protrude radially outward, and extend in the longitudinal direction of the nut 40. The ring gear 56 has grooves 64 that are complementary to the sliding keys 62 on the inside of its bushing 72, in which the sliding keys 62 of the groove 40 engage so that the ring gear 56 is secured against relative rotation with the nut 40.

Through the mobility of the ring gear 56 on the nut 40, the ring gear 56 is de-coupled from an axial force acting on the nut 40. An axial force of this kind acts as a reaction force to the application force, with which the spindle 28 presses the frictional brake lining 14 against the brake disk 16, on the nut 40. This reaction force in the axial direction is completely and exclusively transmitted from the nut 40 to the axial bearing 42 with which the nut 40 is supported against the housing cover 44 of the gear housing 18. The ring gear 56 is completely free of the axial force acting on the nut 40. This de-coupling of the ring gear 56 from an axial force acting on the nut 40 results in as little as possible an axial position change of the ring gear 56 in relation to the bevel gear 58. Such a position change of the ring gear 56 in relation to the bevel gear 58 from a provided structural position would decrease the efficiency and increase the wear of the bevel gear pair 58.

A pivot bearing of the ring gear 56 in the gear housing 18 is carried out by means of an axial roller bearing 66 and two radial bearings 36, 46. The axial bearing 66 is disposed on a side of the ring gear 56 remote from the gear teeth. The radial bearings 36, 46 are disposed close to the end faces on the bushing 72 of the ring gear 56. The axial bearing 66 keeps a spacing of the ring gear 56 from the bevel gear 58 constant in the axial direction of the ring gear 56. The radial bearings 36, 46 prevent a tilting of the ring gear 56. Since the bevel gear 58 is of one piece with the motor shaft 60 of the electric motor 24, a radial bearing of the bevel gear 58 is simultaneously a motor shaft bearing 61 in the housing of the electric motor 24, which motor shaft bearing is visible in the drawing. In order for a position change of the ring gear 56 in relation to the bevel gear 58 due to the stresses that occur during operation of the bevel gear pair 22, particularly under a load, to be kept as slight as possible, the gear housing 18 is embodied as rigid, at least in the region that connects the electric motor 24 via the housing 18 to the bearings 36, 46, 66 of the ring gear 56.

The planetary roller screw drive 20 is only self-locking up to a defined axial force on its spindle 28. If the axial force on the spindle 28 exceeds a limit value, the planetary roller screw drive 20—when the electric motor 24 is without current and the motor brake 26 is released—rotates back until the axial force that corresponds to the brake force of the wheel brake device 10 is reduced to such an extent that self-locking commences. The motor shaft 60 is fixed to the motor brake 26 so that a brake force/axial force can be kept above the self-locking over a longer time without putting strain on the electric motor 24 and its power supply. The motor brake 26 is also required for the function of the wheel brake device 10 as a parking/auxiliary brake. The electric motor 24 is therefore only supplied with current in order to exert and change the brake force and in order to release the wheel brake device 10. When the brake force is kept constant, the electric motor 24 is not supplied with current, which avoids a thermal overloading of the electric motor 24 and reduces a strain on its power supply.

In order to be able to release the wheel brake device 10 in the event of a motor defect or a failure of the power supply of the electric motor 24, the rotation prevention bolt 50 has a tool seat 68 in the form of an internal hexagon for the rotationally fixed engagement of a rotation tool that is not shown. By unscrewing the rotation prevention bolt 50 from the housing cover 44, the spindle 28 that is slid onto the rotation prevention bolt 50 in a rotationally fixed manner can be unscrewed, i.e. removed axially from the brake disk 16, by means of which the frictional brake linings 14 are released from the brake disk 16.

A spring washer 74 is inserted as a pre-stressing element between an end face of the nut 40 oriented toward the brake disk 16 and an inward protruding collar 70 of the bushing 72 of the ring gear 56. The pre-stressing spring element 74 presses the ring gear 56 and the nut 40 away from each other axially, wherein the pre-stressing spring element 74 presses the nut 40 against the axial bearing 42 of the nut 40 and presses the ring gear 56 against the axial bearing 66 of the ring gear 56. The pre-stressing spring element 74 produces an axial freedom from play between the ring gear 56 and the nut 40, which prevents an undesirable coasting when switching from the application to release of the wheel brake device 10 (reversing operation).

The foregoing relates to preferred exemplary embodiments of the invention, it being understood that other variants and embodiments thereof are possible within the spirit and scope of the invention, the latter being defined by the appended claims.

I claim:

1. An electromechanical wheel brake device with an electric motor, which comprises an angular gear that is driven by the electric motor, a rotation/translation conversion gear (20) that has a drive element, said drive element is driven to rotate by the angular gear, and has a driven element, and with a frictional/brake lining that is pressed by the driven element of the rotation/translation conversion gear against a brake body that is fixed against relative rotation with a vehicle wheel, the angular gear is a bevel gear pair (22) with a bevel gear (58) that is driven by the electric motor (24) and a ring gear (56) is connected to a rationally fixed, axially mobile manner to the drive element (40) of the rotation/translation conversion gear (20), and that the ring gear (56) has a separate bearing (36, 46, 66) that is rigidly connected to a bearing (61) of the bevel gear (58) that belongs to the bevel gear pair (22).

2. The electromechanical wheel brake device according to claim 1, in which the bevel gear pair (22) is a spiral.

3. The electromechanical wheel brake device according to claim 2, in which the bevel gear pair (22) is a hypoid geared bevel gear.

4. The electromechanical wheel brake device according to claim 1, in which the gear teeth of the bevel gear pair (22) have an anti-wear coating.

5. The electromechanical wheel brake device according to claim 2, in which the gear teeth of the bevel gear pair (22) have an anti-wear coating.

6. The electromechanical wheel brake device according to claim 3, in which the gear teeth of the bevel gear pair (22) have an anti-wear coating.

7. The electromechanical wheel brake device according to claim 1, in which the rotation/translation conversion gear (20) is embodied as a screw link actuator.

8. The electromechanical wheel brake device according to claim 1, in which the rotation/translation conversion gear (20) is embodied as a planetary roller screw drive.

9. The electromechanical wheel brake device according to claim 1, in which the rotation/translation conversion gear (20) has a pre-stressing device (74) that pre-stresses the drive element (40) of the rotation/translation conversion gear (20) and the ring gear (56) of the bevel gear pair (22) so that there is no play between them and they can move in relation to each other.

10. The electromechanical wheel brake device according to claim 7, in which the rotation/translation conversion gear (20) has a pre-stressing device (74) that pre-stresses the drive element (40) of the rotation/translation conversion gear (20) and the ring gear (56) of the bevel gear pair (22) so that there is no play between them and they can move in relation to each other.

11. The electromechanical wheel brake device according to claim 8, in which the rotation/translation conversion gear (20) has a pre-stressing device (74) that pre-stresses the drive element (40) of the rotation/translation conversion gear (20) and the ring gear (56) of the bevel gear pair (22) so that there is no play between them and they can move in relation to each other.

12. The electromechanical wheel brake device according to claim 1, in which the driven element (28) of the rotation/translation conversion gear (20) has a sliding guide (50, 52) that secures the driven element (28) in a rotationally fixed manner.

13. The electromechanical wheel brake device according to claim 7, in which the driven element (28) of the rotation/translation conversion gear (20) has a sliding guide (50, 52) that secures the driven element (28) in a rotationally fixed manner.

14. The electromechanical wheel brake device according to claim 8, in which the driven element (28) of the rotation/translation conversion gear (20) has a sliding guide (50, 52) that secures the driven element (28) in a rotationally fixed manner.

15. The electromechanical wheel brake device according to claim 9, in which the driven element (28) of the rotation/translation conversion gear (20) has a sliding guide (50, 52) that secures the driven element (28) in a rotationally fixed manner.

16. The electromechanical wheel brake device according to claim 10, in which the driven element (28) of the rotation/translation conversion gear (20) has a sliding guide (50, 52) that secures the driven element (28) in a rotationally fixed manner.

17. The electromechanical wheel brake device according to claim 11, in which the driven element (28) of the rotation/translation conversion gear (20) has a sliding guide (50, 52) that secures the driven element (28) in a rotationally fixed manner.

18. The electromechanical wheel brake device according to claim 12, in which the sliding guide (50, 52) has detachable rotation prevention means.

19. The electromechanical wheel brake device according to claim 13, in which the sliding guide (50, 52) has detachable rotation prevention means.

20. The electromechanical wheel brake device according to claim 14, in which the sliding guide (50, 52) has detachable rotation prevention means.

21. The electromechanical wheel brake device according to claim 15, in which the sliding guide (50, 52) has detachable rotation prevention means.

22. The electromechanical wheel brake device according to claim 16, in which the sliding guide (50, 52) has detachable rotation prevention means.

23. The electromechanical wheel brake device according to claim 17, in which the sliding guide (50, 52) has detachable rotation prevention means.

\* \* \* \* \*